United States Patent [19]

Lazarus et al.

[11] 4,348,314

[45] Sep. 7, 1982

[54] PRODUCTION OF THERMALLY STABILIZED POLYESTER WITH ALKYLENE CARBONATES AND SODIUM OR POTASSIUM THIOCYANATE

[75] Inventors: Stanley D. Lazarus, Petersburg; Robert A. Lofquist, Richmond, both of Va.

[73] Assignee: Allied Corporation, Morris Township, Morris County, N.J.

[21] Appl. No.: 155,375

[22] Filed: Jun. 2, 1980

[51] Int. Cl.$^3$ ............................................. C08G 63/76
[52] U.S. Cl. .................................. 525/439; 525/439; 528/309
[58] Field of Search ................. 260/45.8 A; 525/439; 528/275, 309

[56] References Cited

U.S. PATENT DOCUMENTS

| | | | |
|---|---|---|---|
| 2,465,319 | 3/1949 | Whinfield et al. | 526/71 |
| 2,799,664 | 7/1957 | Drewitt et al. | 525/439 |
| 2,863,854 | 12/1958 | Wilson | 525/439 |
| 3,050,533 | 8/1962 | Munro et al. | 260/346.11 |
| 3,051,212 | 8/1962 | Daniels | 57/902 |
| 3,427,287 | 2/1969 | Pengilly | 528/305 |
| 3,457,238 | 7/1969 | Carter | 528/275 |
| 3,484,410 | 12/1969 | Lazarus et al. | 528/285 |
| 3,491,066 | 1/1970 | Petropoulos | 525/439 |
| 3,657,191 | 4/1972 | Titzmann et al. | 525/439 |
| 3,985,705 | 10/1976 | Georgoudis | 260/45.8 A |

*Primary Examiner*—Lucille M. Phynes
*Attorney, Agent, or Firm*—Richard A. Anderson

[57] ABSTRACT

High molecular weight linear condensation polyesters are stabilized against deterioration by heat by reacting the polyester in molten form with alkylene carbonates in the presence of a catalytic amount of a compound selected from the group consisting of sodium thiocyanate and potassium thiocyanate.

9 Claims, No Drawings

PRODUCTION OF THERMALLY STABILIZED POLYESTER WITH ALKYLENE CARBONATES AND SODIUM OR POTASSIUM THIOCYANATE

BACKGROUND OF THE INVENTION

1. Field of the Invention

This invention relates to a heat stable fiber forming polyester and to a new and novel process for preparing it. More particularly, this invention relates to an improved linear high molecular weight heat stable polyester especially suitable for preparing fibers which have excellent resistance to degradation when utilized in commercial articles, such as tires, industrial belting, etc., wherein a high degree of heat is built up during use.

2. Description of the Prior Art

High molecular weight polyethylene terephthalate fiber forming polyesters are well known. They are prepared commercially either by the ester interchange reaction between dimethyl terephthalate and ethylene glycol or by the direct esterification process wherein terephthalic acid is reacted directly with ethylene glycol. These products and processes are well documented in U.S. patents such as U.S. Pat. Nos. 2,465,319; 3,050,533; 3,051,212; 3,427,287 and 3,484,410 which cover not only the basic products and processes but many improvements thereon.

Polyethylene terephthalate fibers and cords are known to exhibit excellent dimensional stability, that is, low extension or growth during service, as well as to have a high resistance to thermal degradation; however, in pneumatic tires and industrial belts under high speed conditions under heavy load, loss of tensile strength is experienced due to high temperature reactions occurring under such conditions. In efforts to remedy this problem, most research in this field has been directed to producing a high molecular weight linear polyester having a low content of free carboxyl groups. The following patents are pertinent:

U.S. Pat. No. 2,863,854 to Wilson is directed to reacting the carboxyl groups of polyesters with orgnic carbonates, such as ethylene carbonate, in the presence of a catalyst including salts of mineral acids such as zinc chloride. The reaction creates a polyester having fewer carboxyl groups.

Applicants have discovered a very effective catalyst for the above reaction.

U.S. Pat. No. 3,657,191 to Rudolph Titzmann et al. is directed to a process for the manufacture of linear polyesters having an improved stability with respect to compounds with active hydrogen. Polyesters of this type are obtained by reacting polyesters with ethylene carbonates or monofunctional glycidyl ethers.

SUMMARY OF THE INVENTION

The present invention relates to an improved high molecular weight heat stable polyester and to a novel process for preparing it. The invention further provides polyester fibers which have excellent resistance to thermal degradation when utilized in commercial articles, such as tires, industrial belting, etc., wherein a high degree of heat is built up during use.

The process of the present invention provides a high molecular weight linear polyester stabilized against thermal degradation comprising a polyester reacted with a thermally stabilizing amount of an alkylene carbonate, having a 5 or 6 membered ring in the presence of a catalytic amount of a compound selected from the group consisting of sodium thiocyanate and potassium thiocyanate or mixtures thereof.

In general, the carbonate components of the stabilizing combinations of this invention include those compounds having a 5 or 6 membered ring which contains the characteristic carbonate,

group. Among such compounds are included the alkylene carbonates having saturated rings, e.g., ethylene carbonate, propylene carbonate, the substituted and unsubstituted alkylene carbonates, etc.; and the vinylene carbonates having unsaturated —C=C— linkages within the ring, e.g., vinylene carbonate, polyvinylene carbonate, ethylvinylene carbonate, etc. The carbonates of the types having 5 membered rings as discussed above may be typically represented by the following general structures:

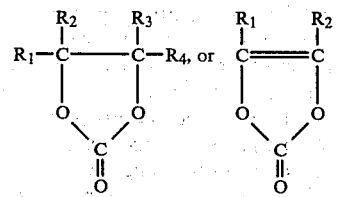

wherein the R's may be H; an aromatic group; an aliphatic group which may be saturated or unsaturated; or alicyclic group, said groups having from 2 to 18 carbon atoms. $R_1$, $R_2$, $R_3$, and $R_4$ may be the same or different.

The useful carbonates having 6 membered rings may be typically represented by the following general structure:

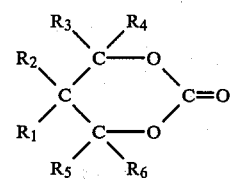

wherein the R's are as defined above.

The preparation of the improved polyester can be carried out by condensing an aromatic dicarboxylic acid, preferably terephthalic acid, and/or the lower alkyl ester thereof with a glycol containing 2 to about 10 carbon atoms per molecule under direct esterification and/or ester-interchange conditions. The esterification product is polycondensed, and a stabilizing amount of the above-described alkylene carbonate stabilizer and catalyst is incorporated in the molten polyester after the polyester has been polycondensed to an intrinsic viscosity of at least 0.4 dl. per gram. Intrinsic viscosity of the polyester is determined by conventional means in 60 percent phenol-40 percent tetrachloroethane mixture.

In continuous production of the improved polyester in accordance with the present invention, the carbonate and catalyst are preferably added to the molten polyester process stream with mixing at a point to give 1 to 10 minutes reaction time under superatmospheric pressure before the polyester enters the final polycondensation zone. The amount of said alkylene carbonate reacted as stabilizer ranges generally from 30 to 170 gram moles of carbonate per $10^6$ grams of the polyester. Preferably, 40 to 120 gram moles of alkylene carbonate is reacted per $10^6$ grams of the polyester. Desirably, about 0.007 to 0.10 grams, preferably 0.01 to 0.08 grams of the thiocyanate compound is added per 100 grams of polyester. The carbonates and thiocyanate compounds useful in the present invention are known compounds and are commercially available.

The esterification of the aromatic dicarboxylic acid and/or the lower alkyl esters thereof and the glycol can start at a temperature as low as 200° C. and range up to 300° C. and at atmospheric and superatmospheric pressures ranging up to 500 psig. The reaction, either the direct esterification or ester-interchange is carried out in the absence of oxygen-containing gas. Preferably, the reaction is carried out at a temperature from about 230° C. to about 280° C. and at a pressure ranging from about 50 to 250 psig. The reaction time will vary depending upon the reaction temperature and pressure. The glycol is reacted with the aromatic dicarboxylic acid and/or the lower alkyl ester thereof in an amount ranging from about 1 to about 3 moles of glycol per mole of acid.

The polycondensation of the esterification product obtained by the direct esterification or ester interchange reaction between the aromatic dicarboxylic acid or lower alkyl ester thereof and the glycol is usually carried out at a reduced pressure which can be as low as 0.1 torr and a temperature in the range of from about 260° C. to about 300° C. This part of the reaction is carried out under these conditions for periods of about 1.0 to about 10 hours and preferably from about 2 to about 6 hours until a polymerized polyester product of the required molecular weight as determined by viscosity or other convenient physical measures is obtained. The duration of such periods depends upon the various process polymerization conditions such as pressure and temperature profiles, ingredient mole ratios, surface generation conditions, catalyst type and concentration, any additives utilized, requisite viscosity, etc. Polycondensation is generally continued until the resultant polyester has an intrinsic viscosity in 60 percent phenol-40 percent tetrachloroethane mixture of about 0.8 to 1.0 dl. per gram.

DESCRIPTION OF THE PREFERRED EMBODIMENT

The present invention provides polyester fibers which have excellent resistance to degradation when utilized in reinforced rubber articles, such as tires, industrial belting, etc., wherein a high degree of heat is built up during use.

EXAMPLES

In order to test the efficiency of various catalyst salts, a Brabender Plastograph was used to heat and mix under nitrogen sweep various polyethylene terephthalate polymers of differing original viscosities. Results are shown in the following table. The amounts given are percent by weight. The conditions of heating and mixing are labeled Brabender Conditions. Successful reactions are those which react the carbonate with the carboxyl end groups so that the resultant product has less than 10 gram equivalent carboxyl groups per $10^6$ grams of polymer. The sodium and potassium iodides are the subject of a co-pending application filed on even date with this application by a different inventive entity.

Note that only the sodium and potassium thiocyanates or iodides are effective. The related alkali halides are not effective.

TABLE
SUMMARY OF ALKALI HALIDE CATALYST TRIALS IN THE REACTION OF ETHYLENE CARBONATE WITH CARBOXYL END GROUPS OF POLYETHYLENE TEREPHTHALATE (PET)

|  | Brabender Conditions | Intrinsic Viscosity | Grams Equivalent of Carboxyl Per $10^6$ of Polymer |
|---|---|---|---|
| 0.95 I.V. PET | | | |
| *0.3% Ethylene Carbonate + 0.02% LiBr | 15 Minutes, 60 rpm, 280° C. | 0.80 | 24.6 |
| 0.3% Ethylene Carbonate + 0.02% LiCl | 15 Minutes, 60 rpm, 280° C. | 0.82 | 27.4 |
| No Additive - Control | 15 Minutes, 60 rpm, 280° C. | 0.87 | 24.5 |
| 0.53 I.V. PET | | | |
| 1.0% Ethylene Carbonate + 0.04% LiCl | 5 Minutes, 30 rpm, 280° C. | — | 13.3 |
| 0.5% Ethylene Carbonate + 0.02% KI | 5 Minutes, 30 rpm, 275° C. | — | 3.2 |
| 0.5% Ethylene Carbonate + 0.03% KI | 5 Minutes, 30 rpm, 275° C. | — | 3.0 |
| 0.5% Ethylene Carbonate + 0.01% KI | 5 Minutes, 30 rpm, 275° C. | — | 6.4 |
| 0.5% Ethylene Carbonate + 0.02% NaSCN | 5 Minutes, 30 rpm, 275° C. | — | 3.6 |
| 1.0% Ethylene Carbonate + 0.02% KI | 5 Minutes, 30 rpm, 283° C. | — | 2.9 |
| 1.0% Ethylene Carbonate + 0.01% KI | 5 Minutes, 30 rpm, 283° C. | — | 3.0 |
| 1.0% Ethylene Carbonate + 0.005% KI | 5 Minutes, 30 rpm, 283° C. | — | 1.5 |
| No Additive Control | 5 Minutes, 30 rpm, 283° C. | — | 21.9 |
| 1.0% Ethylene Carbonate + 0.0025% KI | 5 Minutes, 30 rpm, 283° C. | — | 7.4 |

TABLE-continued
SUMMARY OF ALKALI HALIDE CATALYST TRIALS IN THE REACTION OF ETHYLENE CARBONATE WITH CARBOXYL END GROUPS OF POLYETHYLENE TEREPHTHALATE (PET)

| | Brabender Conditions | Intrinsic Viscosity | Grams Equivalent of Carboxyl Per $10^6$ of Polymer |
|---|---|---|---|
| 1.0% Ethylene Carbonate + 0.0010% KI | 5 Minutes, 30 rpm, 283° C. | — | 18.6 |
| 1.0% Ethylene Carbonate + 0.04% NaSCN | 5 Minutes, 30 rpm, 283° C. | — | 4.1 |
| 1.0% Ethylene Carbonate + 0.02% NaSCN | 5 Minutes, 30 rpm, 283° C. | — | 2.5 |
| 1.0% Ethylene Carbonate + 0.01% NaSCN | 5 Minutes, 30 rpm, 283° C. | — | 2.2 |
| 1.0% Ethylene Carbonate + 0.005% NaSCN | 5 Minutes, 30 rpm, 283° C. | — | 13.1 |
| 1.0% Ethylene Carbonate + 0.08% LiCl | 5 Minutes, 30 rpm, 283° C. | — | 11.1 |
| 1.0% Ethylene Carbonate + 0.04% LiCl | 5 Minutes, 30 rpm, 283° C. | — | 13.3 |
| 1.0% Ethylene Carbonate + 0.015% LiSCN | 5 Minutes, 30 rpm, 283° C. | — | 17.0 |
| 1.0% Ethylene Carbonate + 0.02% NaSCN | 5 Minutes, 30 rpm, 283° C. | — | 6.3 |
| 1.0% Ethylene Carbonate + 0.02% KSCN | 5 Minutes, 30 rpm, 283° C. | — | 3.3 |
| 1.0% Ethylene Carbonate + 0.04% LiI | 5 Minutes, 30 rpm, 283° C. | — | 13.9 |
| 1.0% Ethylene Carbonate + 0.04% MgBr$_2$ | 5 Minutes, 30 rpm, 283° C. | — | 20.3 |
| 1.0% Ethylene Carbonate + 0.01% KI | 5 Minutes, 30 rpm, 283° C. | — | 1.4 |
| 1.0% Ethylene Carbonate + 0.01% NaI | 5 Minutes, 30 rpm, 283° C. | 0.46 | 4.4 |
| 1.0% Ethylene Carbonate + 0.01% CaI$_2$ | 5 Minutes, 30 rpm, 283° C. | 0.51 | 17.4 |
| 1.0% Ethylene Carbonate + 0.01% MgI$_2$ | 5 Minutes, 30 rpm, 283° C. | 0.53 | 19.6 |
| No Additive Control | 5 Minutes, 30 rpm, 283° C. | 0.45 | 20.1 |
| Solutions of 4% KBr + 4% NaCl in ethylene carbonate could not be made (insoluble) - were not evaluated. | | | |
| 1.0% Ethylene Carbonate + 0.01% KBr | 5 Minutes, 30 rpm, 283° C. | — | 20.8 |

*All percentages shown are taken on the weight of the polyester.

We claim:

1. A high molecular weight linear polyester stabilized against thermal degradation comprising a polyester reacted with a thermally stabilizing amount of an alkylene carbonate having a 5 or 6 membered ring in the presence of a catalytic amount of a compound selected from the group consisting of sodium thiocyanate, potassium thiocyanate or mixtures thereof.

2. The polyester of claim 1 wherein the polyester is polyethylene terephthalate.

3. The polyester of claim 1 wherein the alkylene carbonate is ethylene carbonate.

4. In a process for the preparation of a high molecular weight linear condensation polyester wherein terephthalic acid is esterified with a glycol containing 2 to 10 carbon atoms per molecule under esterification conditions and the resulting esterification product is polycondensed, the improvement which comprises providing a reduction in the free carboxyl content of the polyester to a carboxyl concentration of less than 10 gram equivalents per $10^6$ grams of polyester by reacting the polyester in molten form with a thermally stabilizing amount of a stabilizer comprising an alkylene carbonate having a 5 or 6 membered ring in the presence of a catalytic amount of a compound selected from the group consisting of sodium thiocyanate, potassium thiocyanate or mixtures thereof.

5. The process of claim 4 wherein the glycol is ethylene glycol.

6. The process of claim 4 wherein the carbonate is ethylene carbonate.

7. In a continuous process for the preparation of a high molecular weight linear condensation polyester particularly useful for preparation of tire yarn, wherein terephthalic acid is continuously esterified with a glycol containing 2 to 10 carbon atoms per molecule under esterification conditions and the resulting esterification product is continuously polycondensed in a series of polycondensation zones at subatmospheric pressure, the improvement which comprises providing a reduction in the free carboxyl content of the polyester to a carboxyl concentration of less than 10 gram equivalents per $10^6$ grams of polyester by reacting the polyester in molten form at about 270° C. to 300° C. with a thermally stabilizing amount of carbonate in the presence of a catalytic amount of a compound selected from the group consisting of sodium thiocyanate, potassium thiocyanate or mixtures thereof, said process being further characterized in that the carbonate and catalyst are added to the polyester process stream with mixing after the penultimate polycondensation zone and at a point to give 1 to 10 minutes reaction with the polyester before the polyester enters the last polycondensation zone, said reaction between the carbonate and the polyester being carried out under superatmospheric pressure.

8. The process of claim 7 wherein the glycol is ethylene glycol.

9. The process of claim 7 wherein the carbonate is ethylene carbonate.

* * * * *